US006883070B2

(12) United States Patent
Martin et al.

(10) Patent No.: US 6,883,070 B2
(45) Date of Patent: Apr. 19, 2005

(54) BANDWIDTH-ADAPTIVE, HYBRID, CACHE-COHERENCE PROTOCOL

(75) Inventors: Milo M. K. Martin, Madison, WI (US); Daniel J. Sorin, Madison, WI (US); Mark D. Hill, Madison, WI (US); David A Wood, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 649 days.

(21) Appl. No.: 10/037,727

(22) Filed: Oct. 19, 2001

(65) Prior Publication Data

US 2002/0133674 A1 Sep. 19, 2002

Related U.S. Application Data

(60) Provisional application No. 60/275,743, filed on Mar. 14, 2001.

(51) Int. Cl.[7] .................. G06F 12/08; G06F 15/167
(52) U.S. Cl. .................. 711/141; 711/146; 711/207; 709/224; 709/230
(58) Field of Search .................. 711/141, 144–146, 711/3, 205, 207; 710/104–105, 240; 709/213, 216, 253, 230, 245, 224, 239, 225

(56) References Cited

U.S. PATENT DOCUMENTS 6,510,496 B1 * 1/2003 Tarui et al. .................. 711/147
6,535,957 B1 * 3/2003 Arimilli et al. .............. 711/118
2001/0013089 A1 * 8/2001 Weber .................. 711/146

OTHER PUBLICATIONS

Scott et al., "Performance of Pruning–Cache directories for large–Scale Multiprocessors" 1993, IEEE, vol. 4, No. 5, pp 520–534.*

Bilir, E. Ender et al., Multicast Snooping: A New Coherence Method Using a Multicast Address Network, ISCA'99 Submission, University of Wisconsin—Madison, pp. 1–22, May 2–4, 1999.

* cited by examiner

Primary Examiner—Denise Tran
(74) Attorney, Agent, or Firm—Quarles & Brady LLP

(57) ABSTRACT

A cache coordination mechanism for a multiprocessor, shared-memory computer switches between a snooping mechanism where an individual processor unit broadcasts or multicasts cache coherence messages to each other node on the system and a directory system where the individual processor unit transmits the cache control message to a directory which then identifies potential candidates to receive that message. The switching is according to the activity on the communication network used by the cache coherence messages. When network activity is high, a directory protocol is used to conserve bandwidth but when network activity is low, a snooping system is used to provide faster response.

32 Claims, 3 Drawing Sheets

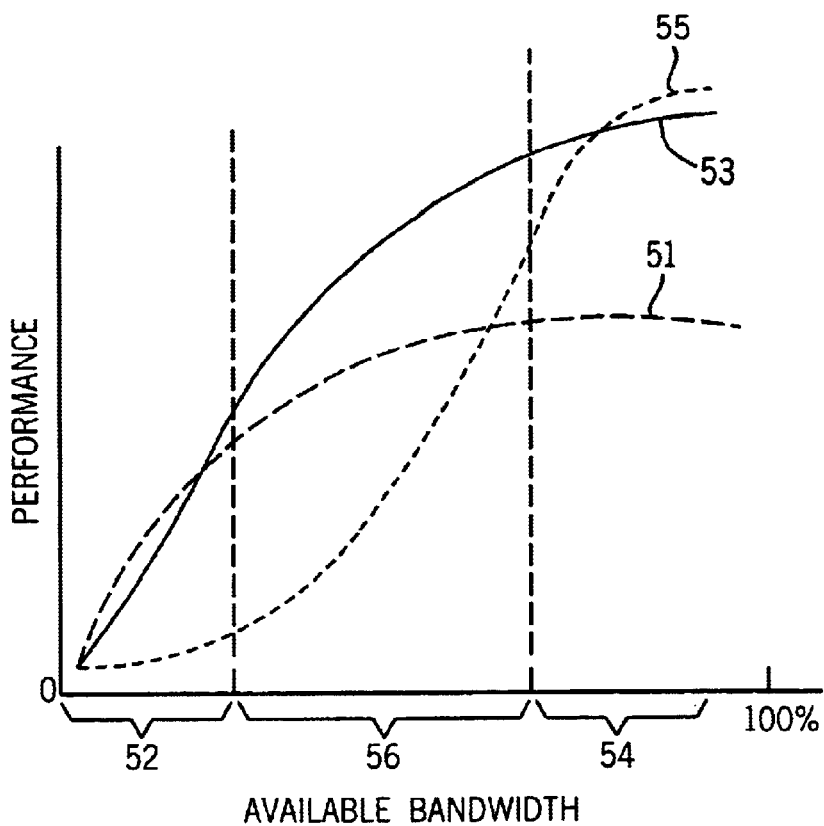
FIG. 5
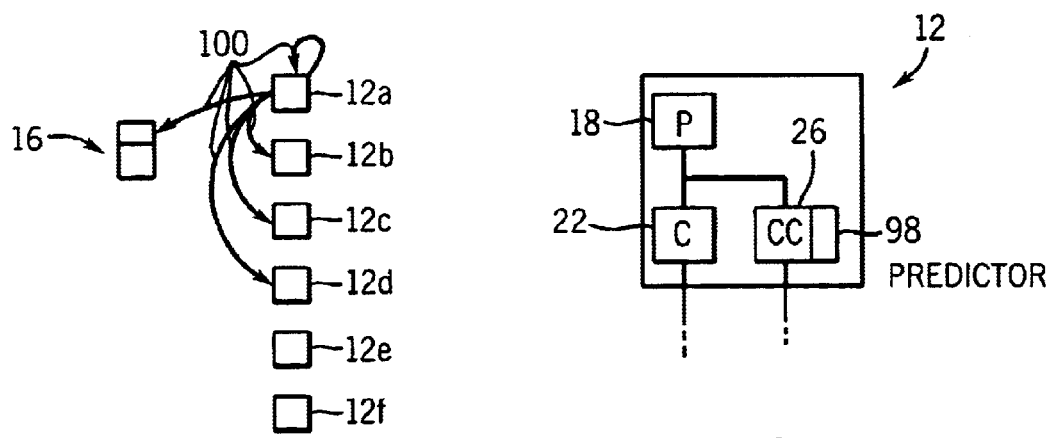
FIG. 7
FIG. 8

BANDWIDTH-ADAPTIVE, HYBRID, CACHE-COHERENCE PROTOCOL

CROSS-REFERENCE TO RELATED APPLICATIONS

This application claims the benefit of provisional application No. 60/275,743 filed Mar. 14, 2001.

STATEMENT REGARDING FEDERALLY SPONSORED RESEARCH OR DEVELOPMENT

This invention was made with United States government support awarded by the following agencies:

NSF 9971256

The United States has certain rights in this invention.

BACKGROUND OF THE INVENTION

The present invention relates generally to a system for coordinating cache memories in a shared-memory computer architecture, and in particular, to a system that chooses a mechanism for communicating cache coherence messages based on the bandwidth available for transmitting such messages.

Large computer software applications, such as simulators and database servers, require cost-effective computation beyond that which can be provided by a single microprocessor. Shared-memory, multiprocessor computers have emerged as a popular solution for running such applications.

Most shared memory multiprocessor computers provide each constituent processor with a cache memory into which blocks of the shared memory may be loaded. The cache memory allows faster memory access. A coherence protocol ensures that the contents of the cache memories accurately reflect the contents of the shared memory. Generally, such protocols invalidate all other cache memories when one cache is written to, and updating of the main memory before a changed cache is flushed.

Two important classes of protocols for maintaining cache coherence are "snooping" and "directories". In the snooping protocols, a given cache, before its processor reads or writes to a block of memory, "broadcasts" a request for that block of memory to all other "nodes" in the system. The nodes include all other caches and the shared memory itself. The node "owning" that block responds directly to the requesting node, forwarding the desired block of memory. A refinement of snooping, is "multicast snooping", in which the requesting node attempts to predict which of the other nodes has a copy of the desired block, and rather than broadcasting its request, the requesting node performs a multicast to the predicted copy holders. This technique is described in *Multicast Snooping: A New Coherence Method Using a Multicast Address Network,* E. Ender Bilir, Ross M. Dickson, Ying Hu, Manoj Plakal, Daniel J. Sorin, Mark D. Hill, and David A. Wood, International Symposium on Computer Architecture (ISCA), 1999, hereby incorporated by reference.

In the directory protocols, a given cache "unicasts" its request for a block of memory to a directory which maintains information indicating those other caches using that particular memory block. The directory then "multicasts" requests for that block directly to a limited number of indicated caches. Generally, the multicast will be to a superset of the caches, over those that actually have ownership or sharing privileges, because of transactions which are not recorded in the directory, as is understood in the art.

Snooping protocols are often used with small computers because they transmit the necessary cache messages quickly without the delaying intermediate step of using the directory. For large systems with many processors, however, snooping generates large numbers of messages which may overwhelm a communications channel. For this reason, the directory protocol, which focuses communications only to a limited number of relevant caches, may be desirable in larger, multiprocessor machines.

While the above principals guide the system designer in selecting between snooping and directory protocols, the decision can be complicated. First, many multiprocessor units are designed to accommodate a range of different processor numbers. Selecting one of a directory protocol or a snooping protocol will result in less than optimal performance when the same system is configured with different numbers of processors or in certain upgrade operations where more processors are added to the system.

Second, even for a fixed number of processors, the application being executed may result in a radically different demand on the cache protocol communication network for which one of the snooping or directory protocols will be preferable to the other protocol. For any given system, the amount of memory traffic may vary significantly over time.

What is needed is a cache coherence protocol that works better with these varying real-world conditions.

BRIEF SUMMARY OF THE INVENTION

The present invention provides an adaptive, hybrid protocol that is sensitive to the bandwidth available for communication of cache protocol messages. Specifically, the hybrid protocol performs like snooping if bandwidth is plentiful, and performs like a directory if bandwidth is limited.

The adaptability of the present invention provides improved performance over a range of different sizes of multiprocessor machines, running a variety of different applications, and during different phases of the execution of those applications. Simulation suggests that not only does the hybrid protocol outperform snooping for periods of high bandwidth demand and outperform directory systems for periods of plentiful bandwidth, but also outperforms both snooping and bandwidth for intermediate bandwidth availability, a state likely to dominate in many practical system applications.

Specifically then, the present invention provides a method and apparatus for coordinating cache memories in a multiprocessor computer having at least two processor units each with a processor and cache memory, and further having a shared memory, where the processor units communicate cache coherence messages over a network. The invention provides for two mechanisms for communicating cache coherence messages. When the first, snooping mechanism is used, the cache coherence messages are sent directly from a given processor to another processor. When the second, directory mechanism is used, the cache coherence messages are sent directly from a given processor to a directory and then to multiple processor units indicated by the directory. Available bandwidth on the network, used to communicate the cache coherence messages, is evaluated and for a given cache coherence message, different mechanisms for communication of the cache coherence message are used depending on the evaluation of available bandwidth.

Thus, it is a first object of the invention to provide multiple communication mechanisms for cache coherence messages, where the particular mechanism may be selected dynamically as a function of the available bandwidth.

The snooping mechanism may broadcast the given cache coherence message to all other processor units.

Thus, it is an object of the invention to provide a direct communication mechanism when bandwidth is plentiful.

The given cache coherence message may be related to a portion of the shared memory and the directory may provide an index linking portions of the memory to a given set of processor units and the directory mechanism may send the cache coherence message to the given set of processor units linked to the portion of the shared memory related to the given cache coherence message.

Thus, it is another object of the invention to provide for a focused transmission of cache coherence messages to less than all the processors when bandwidth is limited.

When used in a hybrid system with multicast snooping, the directory may send the cache coherence message directly over the network to the given set of processor units.

In this way, the invention streamlines the directory process over the process normally used in multicast snooping by eliminating the need to send a NACK signal to the originating processor requiring the originating processor to start over with the request.

The method may include the steps of detecting insufficiency in the set of processor units to which coherence messages are sent, when using the directory, and retrying the transmission a predetermined number of times if there is an insufficiency, and afterwards, reverting to a broadcasting of the given cache coherence message to all processor units.

Thus, it is another object of the invention to address possible problems of live lock wherein one processor unit using the directory technique is unable to compete with other processor units using a direct broadcast technique.

The processor units in responding to a retry of the cache coherence message may add a retry number to the forwarded data to link it to a specific cache coherence message.

Thus, it is another object of the invention to eliminate ambiguity at the receiving node when the directory undertakes retries.

The evaluation of available bandwidth may compare the available bandwidth against a predetermine threshold and select the mechanism of snooping in situations where the available bandwidth is greater than the threshold and the mechanism of directory in situations where the available bandwidth is less than the threshold. This decision may be a simple or complex function of the thresholding process. The threshold may be less than all the bandwidth of the network.

Thus, it is another object of the invention to provide a flexible method of dynamically selecting between cache coherence message transmission mechanisms based on a simple threshold that may be empirically derived.

The step of selecting the mechanism for communication of cache coherence messages may provide a mix of selections of snooping and directory mechanisms where the mix is a function of the evaluation of the available bandwidth and has greater than two values. In one embodiment, the mix may be generated pseudorandomly according to a probability function based on the evaluation of available bandwidth.

Thus, it is another object of the invention to provide an effectively continuous variation in the mechanism selection process to provide improved control dynamics.

In this hybrid directory/snooping system, the mechanism of snooping may use multicast snooping where the cache coherence message is transmitted to a selected set of processor units based on a prediction as to which processor units have caches loaded with relevant data.

Thus, it is another object of the invention to provide the benefits of this hybrid system together with an alternative to broadcasting to all processors during snooping.

The directory monitors the multicast to determine insufficiency in the set of targets of the multicast resulting from erroneous prediction to initiate a retransmission of the cache coherence message.

It is another object of the invention to provide a lower latency correction mechanism for speculatively multicasting.

The step of evaluating the available bandwidth may monitor the communication on the network at the processor unit transmitting the given cache coherence messages.

Thus it yet another object of the invention to provide for a simple approximation of network bandwidth that may be performed locally at each processor unit.

The foregoing objects and advantages may not apply to all embodiments of the invention and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

BRIEF DESCRIPTION OF THE DRAWINGS

FIG. 5 is a simplified graph plotting performance of the cache communications in the multiprocessor unit versus available bandwidth of the network for each of the snooping mechanism alone, the directory mechanism alone, and for the present invention which switches between the snooping and directory mechanisms based on network bandwidth, the graph showing the superiority of the present invention;

FIG. 7 is a figure similar to that of FIG. 2 showing the multicasting cache coherence message transmission mechanism of FIG. 5; and FIG. 8 is a detail of a processor unit similar to that of FIG. 1 showing the addition of a predictor to the cache controller to allow multicasting of FIGS. 5 and 6.

DETAILED DESCRIPTION OF THE PREFERRED EMBODIMENT

Figure 1:
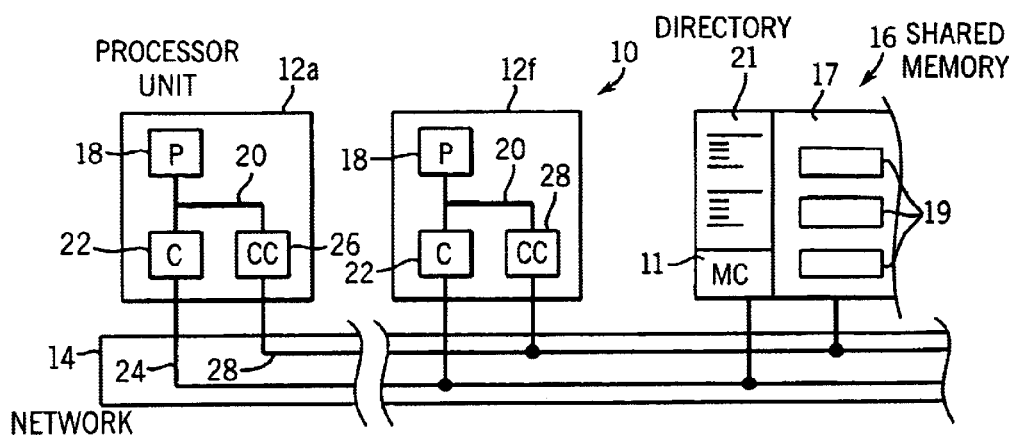
FIG. 1 is a fragmentary block diagram of multiprocessor architecture employing a number of processor units, each processor unit having a processor, a cache, the latter including a cache controller, the processor units communicating on multiple logical networks with a memory having a directory.

Referring now to FIG. 1, a multiprocessor, shared-memory, computer system 10 includes a number of processor units 12 communicating on a network 14 with a shared memory system 16. Although the shared memory system 16 is depicted as a single unitary structure, in practice, the physical memory of the shared memory system 16 may be distributed among different processor units 12 to be shared over a network or the like. The shared memory system 16 includes a shared memory 17 of conventional architecture and storing a number of memory blocks 19, a directory 21, and a memory controller 11 as will be described below.

Each processor unit 12 includes a processor 18 connected over an internal bus 20 with a cache memory 22 and cache controller 26. Only two processor units are shown in FIG. 1, however, the present invention is applicable to architectures having an arbitrary number of processor units and is particularly well suited for multiprocessor, shared-memory, computer systems 10 accepting variable numbers of processor units 12.

During operation of the computer system 10, the cache memory 22 may receive a copy of a block 19 of the shared memory 17 to speed execution of reading or writing of that block 19 by its associated processor 18. The directory 21 records which cache memory 22 holds which block 19, providing a table that links each block 19 to all cache memories 22 having a copy of that block 19. The directory 21 may also indicate the status of that block 19 in each cache memory 22 as, for example "owned" indicating the processor unit 12 associated with the cache memory may perform reads or writes to the block 19, or "shared" indicating that the processor associated with the cache memory 22 may only read the block, as is understood in the art.

The cache controllers 26 communicate cache coherence messages with the memory controller 11 of the shared memory system 16 or other cache controllers 26 along an ordered request network 28. The ordered request network 28 observes the requirement that each of the cache controllers 26 and the directory 21 receive the requests in the same order although not necessarily synchronously. The invention, however, is not limited to this type of ordered network, but may also be used with networks that allow certain reordering of the requests.

The cache coherence messages generally help to provide a consistent ordering of reads and writes of multiple processor units 12 as is understood in the art. The present invention is applicable to a variety of cache coordination messages but of particular importance is a request for a memory block 19 that must be made by a cache memory 22 prior to writing to the cache memory 22.

The cache memories 22 may receive data (also broadly part of the cache coherence messages as the term is used herein) from the shared memory system 16 or other cache memories 22 along a nonordered data network 24 providing rapid transfer of data between cache memories 22 and the shared memory 17 or other cache memories 22.

Figure 2:
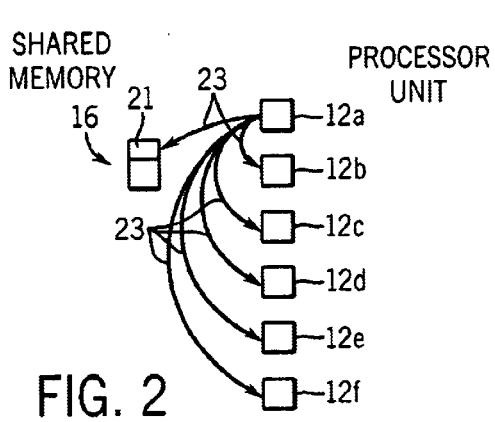
FIG. 2 is a simplified representation of the processor units and memory of FIG. 1 showing a snooping, cache coherence message transmission mechanism used in the present invention.

Referring now to FIG. 2, when a snooping mechanism is used for the transmission of cache coherence messages, for example, from a processor unit 12a, the cache coherence message is duplicated and broadcast over the ordered request network 28 to each of the remaining processor units 12b through 12f and the memory controller 11 of the shared memory system 16 as indicated by the arrows 23 of FIG. 2. When the cache coherence message is a request for a block 19, that cache memory 22 owning the block 19 (or the shared memory system 16 if it is the owner) responds by relinquishing the block 19 to the cache memory 22 of the requesting processor unit 12a. Snooping is rapid, but requires a large number of messages as is apparent from FIG. 2.

Figure 3:
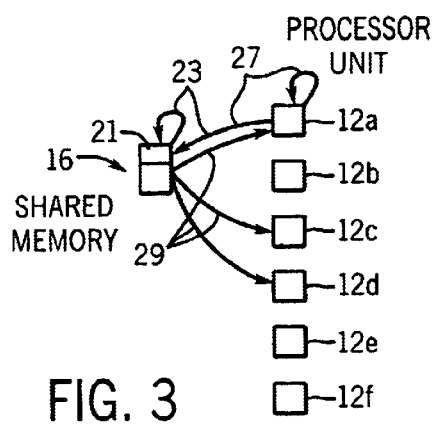
FIG. 3 is a figure similar to that of FIG. 2, showing a directory cache coherence message transmission mechanism also used in the present invention.

Alternatively, referring to FIG. 3, when a directory mechanism is used for the transmission of cache coherence messages, the processor unit 12a dual-casts the cache coherence message (arrow 27) to itself and the directory 21 which identifies those processor units, for example, processor units 12c and 12d (or the memory systems 16 itself) having the desired block 19 (e.g. as an owner or sharer of the block 19). The directory 21 then multicasts the cache coherence message (arrows 29) to those specifically identified processor units (12c and 12d) and the originating, processor 12a and itself only. As is apparent from this example, the number of cache coherence messages required to be transferred over ordered request network 28 is much reduced with respect to the snooping mechanism. This disparity grows even more pronounced as additional processor units 12 are added. However, it will also be evident, that the two-step process with the communication with the directory 21 imposes a delay in the transmission of cache coherence messages.

Figure 4:
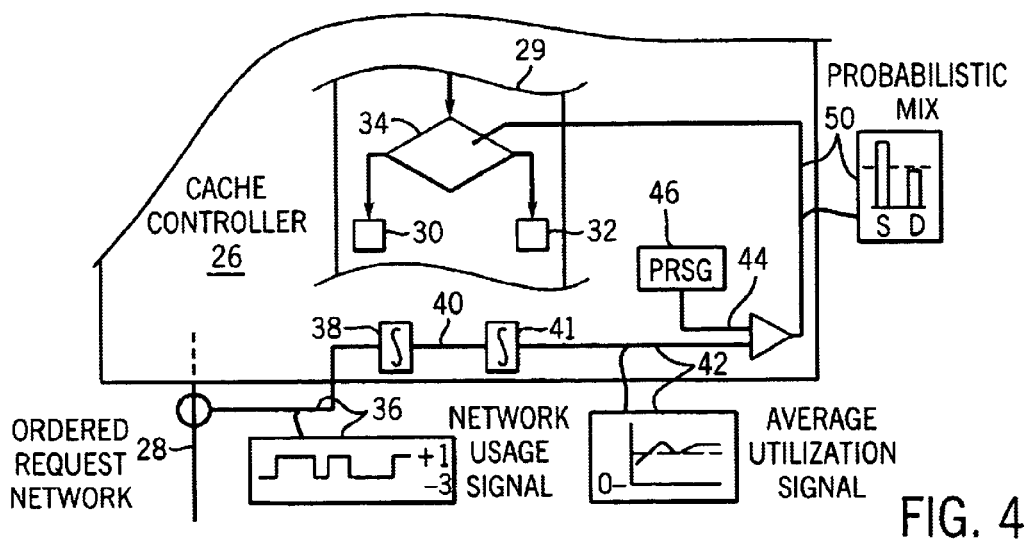
FIG. 4 is a detailed fragmentary view of the cache controller of FIG. 1 showing the functional elements of the bandwidth monitoring of the present invention to selected between a snooping and directory protocol.

Referring now to FIG. 4 in the present invention, the cache controller 26 implements a state machine 29 that may execute either a snooping mechanism 30 or a directory mechanism 32. This state machine 29 provides for a switch 34 whose state selects between these mechanisms for the transmission of a given cache coherence message over the ordered request network 28.

Generally, the state of the switch 34 is determined by monitoring the message traffic on the ordered request network 28. Specifically, the cache controller 26 receives a network usage signal 36 having a high state indicating that the ordered request network 28 is receiving or transmitting messages related to the cache memory 22 and a low state indicating that the ordered request network 28 is idle with respect to cache memory 22. A weighting may be applied to the network usage signal 36 to create a threshold as will be explained below. In the preferred embodiment, a +1 weighting is assigned to the high state of the network usage signal 36 and a −3 weighting is assigned to the low state of the network usage signal 36. This weighted signal is periodically sampled and integrated by integrator 38 implemented, for example, by a saturating seven-bit signed adder. If at the sampling time, the network usage signal 36 is in the high state, the adder adds 1 to its value, whereas if at the sampling time the network usage signal 36 is in the low state, the adder subtracts 3 from its value. The weighting described above causes the output 40 of the integrator 38 to swing about a zero value when the utilization of the network is about 75%; saturation of the adder effectively limits the range of the output 40 of the integrator 38 to between −64 and +64.

It will thus be understood that the output 40 of integrator 38 provides a value dependent on the duty cycle of the network usage signal 36 and thus provides an approximation of available network bandwidth, with negative output values representing less than 75% of the bandwidth being used and positive values representing more than 75% of the bandwidth being used. This threshold of 75% may be adjusted by changing the weighting to account for the limited sampling of the ordered request network 28 at only one processor unit 12 and may be adjusted empirically.

The term bandwidth as used herein is intended to indicate generally a measure of the amount of data that can be transmitted per time on the ordered request network 28 and is intended to include the effects both of the speed of the network (e.g. how many bits per second can be transmitted on a network line), and the width of the network (e.g. how many lines are run in parallel for the network).

The output 40 of integrator 38 is periodically sampled (every 128 cycles) by a second integrator 41 implemented by a saturating six-bit unsigned counter, each sampling resetting the integrator 38 to provide an average utilization signal 42. If the output 40 of integrator 38 is positive, this indicates that the utilization of the ordered request network 28 is greater than 75% and the counter of the second integrator 41 counts up one, whereas if the average output 40 of integrator 38 is negative this indicates that the utilization of the ordered request network 28 is less than 75% and the counter of the integrator 41 counts down one.

This average utilization signal 42 could be provided directly to a comparator whose output is used to directly control the state of switch 34 so that the snooping mechanism 30 is used whenever the utilization indicated by the average utilization signal 42 is below a threshold (for example, half its output range) and directory mechanism 32 is used whenever the average utilization signal 42 is above threshold.

This approach, however, would provide a relatively coarse control system, so accordingly, in preferred embodiment of the present invention, the average utilization signal 42 is treated as a probability function to be compared with a pseudorandom sequence 44 produced by pseudorandom sequence generator 46. Only if the average utilization signal 42 is greater than the pseudorandom sequence 44 is the directory mechanism 32 used and in all other cases, snooping mechanism 30 is used to create a probabilistic mix 50 of selections of the snooping mechanism 30 and directory mechanism 32 for each cache protocol message being transmitted. The balance of the mix 50 varies continuously as a function of the deviation of average utilization signal 42 from the selected threshold so that as the network utilization increases, the mix 50 favors directory transactions and as it decreases, the mix 50 favors snooping transactions.

Referring now to FIG. 5, for a period 52 of low available bandwidth, generally, the performance 51 of a directory mechanism 32 is superior reflecting, intuitively, the fact that broadcast systems will tend to overuse the bandwidth of the ordered request network 28 slowing the net transfer of information. In contrast, the performance 55 of a snooping mechanism 30 during periods 54 of high available bandwidth will exceed the directory mechanism 32, the latter which is fundamentally limited by the indirection through the directory 21, which increases latency. Interestingly, empirical studies have shown that the performance 53 of the present invention can provide comparable performance to both the snooping mechanism 30 and the directory mechanism 32 in these periods 52 and 54 yet superior performances to both mechanisms in periods 56 of mid-bandwidth utilization. This surprising result reflects the fact that the present system better utilizes available bandwidth creating fewer issues of interference.

Referring again to FIG. 1, generally each of the processor units 12 responds to a cache coherence message from another processor unit 12 or from the memory controller 11 of the shared memory system 16 requesting a block 19, by evaluating whether they have that block 19 in their cache memory 22. If they have that block in the capacity of an owner, and the request is for sharing, they downgrade their ownership to a sharing status. If on the other hand, the request is for ownership, they invalidate their cache memory 22 and transmit ownership and the data of that block 19 to the requesting processor unit 12. If on the other hand, the request is for ownership and the cache 22 has a shared copy, it downgrades its shared copy to invalid.

Figure 6:
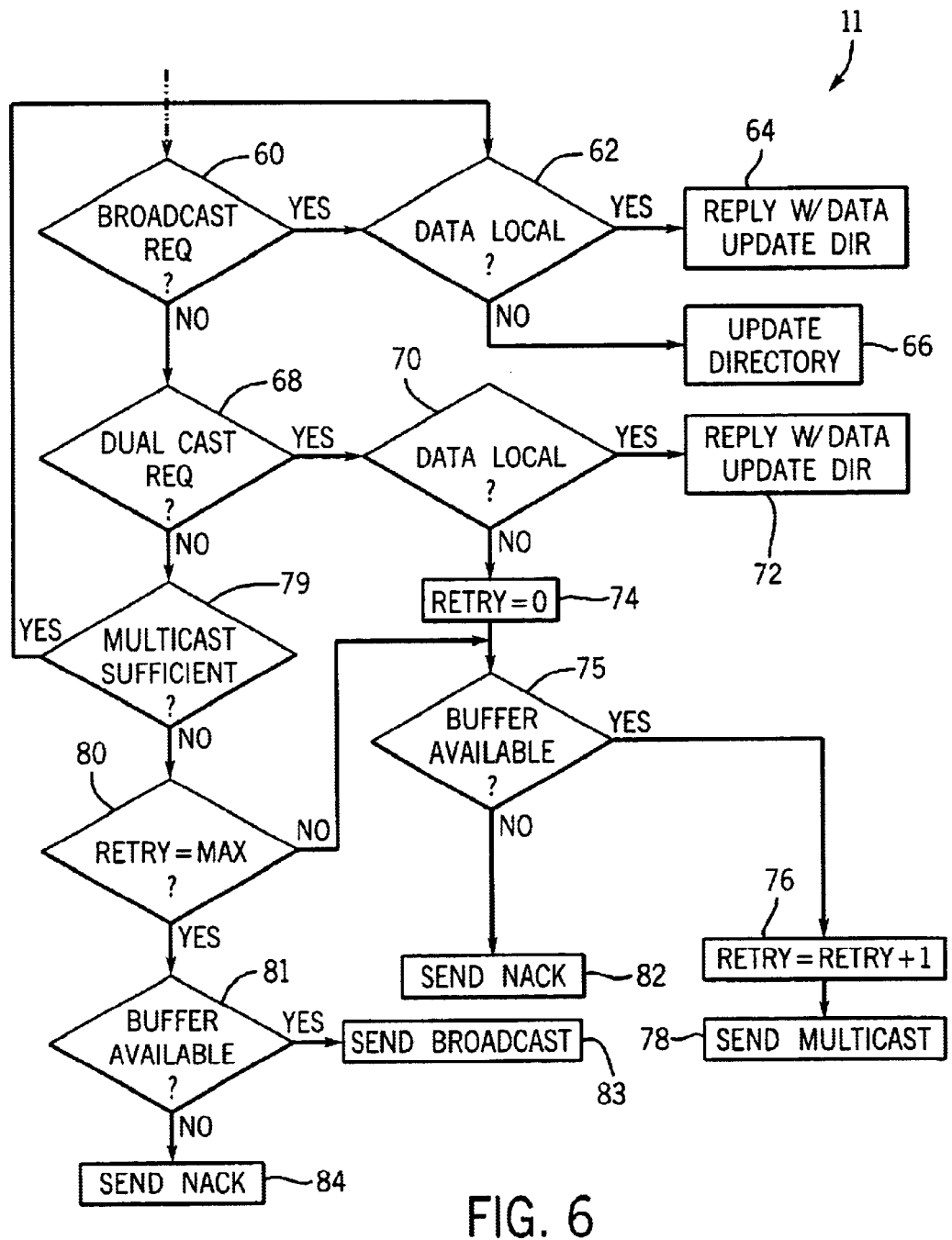
FIG. 6 is a flow chart showing the steps of a program executing by the directory of the memory of FIG. 1 in responding to a broadcast or dual-cast message, or in a second embodiment, to a multicast message.

Referring now to FIG. 6, the procedure executed by the memory controller 11 of the shared memory system 16 is somewhat more involved. If a cache coherence message requesting a block 19 is received as part of a broadcast request, as determined by decision block 60 implemented in circuitry within the memory controller 11, then the memory controller 11 proceeds to decision block 62 to determine whether the requested data is owned by the shared memory 17. If so, as indicated by process block 64, the memory controller 11 replies with the block 19 and updates its directory 21 indicating the new copy holders as identified to one or more cache memories 22. Invalidation of the other caches is performed by the broadcast message only if necessary due to an ownership change.

If the block 19 is not owned by the memory controller 11 as determined by decision block 62, then at process block 66, the directory 21 is updated to indicate new copyholders as needed but no data is sent.

If at decision block 60, the cache coherence message is not a broadcast request, the memory controller 11 proceeds to process block 68 to determine whether the message is part of a dual-cast request to the directory 21. If so, memory controller 11 proceeds to decision block 70 to determine if the requested block 19 is owned by the shared memory 17. If so, then at process block 72, the shared memory 17 replies with the data and the memory controller 11 updates its directory 21.

If the block 19 of a dual-cast request is not owned by the memory controller 11, as indicated at decision block 70, and as determined through review of the directory 21, the memory controller 11 proceeds to process block 74 and a retry number (stored within the messages) is initialized to zero. The memory controller 11 then proceeds to check to see if a message can be injected on the ordered request network 28 as indicated by decision block 75.

If a network buffer is not available (as a necessary condition to getting on the ordered request network 28), then at decision block 75, a deadlock situation is possible and the memory controller 11 proceeds to process block 82 to send a NACK (no acknowledgement) signal to the cache controller 26 originating processor unit 12 for it to start over.

When a network buffer is available, the memory controller 11 proceeds from decision block 75 to process block 76 and the retry number is incremented, and at process block 78 a multicast message is sent only those processor units 12 indicated by its directory 21 to have relevant data in their cache memories 22 and to the processor unit 12 originating the request, and to itself. The value of the retry number is appended to the multicast messages.

The multicast message will be received by the memory controller 11 and reviewed at decision block 79 by comparing the scope of the multicast with the directory 21. If no intervening request has changed the directory 21 so that the multicast addressees are still sufficient, then the multicast is sufficient and the memory controller 11 branches to decision block 62 as described above. If the set of targets of the multicast is insufficient, however, the memory controller 11 moves to decision block 80 to check if the value of the retry number is at its maximum (set in the preferred embodiment to three).

If the retries have not been exhausted, the memory controller 11 branches to decision block 75 as has been described to undertake yet another retry multicast. Processor units 12 responding to a multicast, append the retry number to their responses to allow the origination processor unit to match responses with retry requests on the ordered request network 28.

If the number of multicast retries have been exhausted then the memory controller 11 checks at decision block 81

(similar to decision block 75) whether there is a buffer available on the ordered request network 28 so as to forestall a deadlock situation. If a buffer is available, the memory controller 11 moves to process block 83 and sends a broadcast request to all other processor units 12. If there is no buffer available, a NACK is sent to the origination processor unit 12 to let it initiate the process again.

Referring now to FIG. 7, in an alternative embodiment, the invention may alternate between a directory mechanism 32 and a snooping mechanism 30 where the latter undertakes less than a full broadcast to all of the processor units 12 and memory controller 11 but instead multicasts (as indicated by arrows 100) only to itself, processor units 12 likely to have the desired block 19 and memory controller 11. This multicast also includes the retry number.

Referring also to FIG. 8, in this embodiment, the cache controller 26 is augmented by a predictor 98, which endeavors to predict those processors units 12a through 12f likely to have copies of the block 19 being sought. The predictor 98 may make its predictions in a number of ways including, for example, storing information about recent mispredictions to the same block 19, recent mispredictions to any block 19, behavior of spatially adjacent blocks 19, recent mispredictions of the same static load or store instructions (indexed to the program counter), input form the software (the programmer, compiler, library or runtime system or some combination of these).

Referring again to FIG. 6, when multicasting snooping is allowed, the memory controller 11 may detect a multicast as one of the possibilities after decision block 68 and monitor the multicast by the originating processor unit 12 as indicated by process block 79. This monitoring checks the success of the multicast, as with the multicast from the memory controller 11.

If the multicast by the originating processor unit 12 is successful, the memory controller 11 will do nothing except update its directory 21 per the path of decision block 62, but if the multicast is insufficient, meaning that it was sent to fewer than the necessary processor units 12, the memory controller 11 may initiate its own multicasting message per the path of decision block 80. No NACK need be sent to the initiating processor unit 12 which may deduce an error occurred by receipt of the multicasting message from the memory controller 11.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A method of coordinating at least two processor units, each having a processor and cache memory, and communicating cache coherence messages with each other and a shared memory over a network, the method comprising the steps of:
    (a) providing a mechanism for communications of cache coherence messages directly from a given processor unit to another processor unit;
    (b) providing a mechanism for communication of cache coherence messages directly from a given processor unit to a directory and then to at least one other processor unit when indicated by the directory;
    (c) evaluating the available bandwidth on the network used to communicate the cache coherence messages; and
    (d) for a given cache coherence message, selecting one the mechanism of step (a) or the mechanism of step (b) based on the evaluation of step (c).

2. The method recited in claim 1 wherein the mechanism of step (a) broadcasts the cache coherence message to all other processor units.

3. The method recited in claim 1 wherein the given cache coherence message identifies a block of the shared memory and wherein the directory provides an index linking blocks of memory to a set of processor units less than all the processor units and wherein the mechanism of step (b) sends the cache coherence message to the given set of processor units linked to the block of shared memory identified by the given cache coherence message.

4. The method recited in claim 3 wherein the directory sends the cache coherence message directly over the network to the given set of processor units.

5. The method recited in claim 3 including the step of:
    (e) detecting insufficiency in the set of processor units to which the coherence message is transmitted;
    (f) retrying the transmission of the cache coherence message to the given set of processor units; and
    (g) upon repeated insufficiency in the set of processor units to which the transmission of the coherence message is retried in step (f), broadcasting the given cache coherence message to all processor units.

6. The method of claim 5 wherein retries of the transmission of the cache coherence message append a retry number to the cache coherence message and responses to the cache coherence message.

7. The method recited in claim 5 wherein the number of retries is limited to predetermined number less than ten.

8. The method recited in claim 1 wherein the evaluation of available bandwidth compares the available bandwidth against a predetermined threshold and selects the mechanism of step (a) when the available bandwidth is greater than the threshold and selects the mechanism of step (b) when the available bandwidth is less than the threshold.

9. The method recited in claim 8 wherein the threshold is less than all of the bandwidth of the network.

10. The method recited in claim 9 wherein the threshold is substantially 75% of the capacity of the network.

11. The method recited in claim 1 wherein step (d) provides for successive given cache coherence messages being transmitted using a mix of selections of the mechanism of step (a) and the mechanism of step (b) the mix being a function of the evaluation of step (c) to provide a semi-continuous variation in the mix.

12. The method recited in claim 11 wherein the selection of the mechanism of step (a) or the mechanism of step (b) for a given cache coherence message is done pseudorandomly according to a probability function based on the evaluation of step (c).

13. The method recited in claim 1 wherein the mechanism of step (a) multicasts the cache coherence message to a selected set of processor units based on a prediction as to which processor units have cache memories loaded with relevant data.

14. The method recited in claim 13 wherein a directory monitors the multicasting to detect insufficiency in the targets of the multicasting resulting from erroneous prediction and to initiates a retransmission of the cache coherence message.

15. The method recited in claim 1 wherein step (c) of evaluating the available bandwidth monitors the communications on the network at the given processor unit transmitting the given cache coherence message.

16. The method recited in claim 1 wherein the mechanism of step (b) communicates cache coherence messages directly from a given processor unit to a directory and to the given processor unit.

17. Cache-coherence circuitry for a computer architecture having: (a) a shared memory, (b) at least two processor units, each having a processor and cache memory, and (c) a network for communicating cache coherence messages among the processor units and the shared memory, the cache-coherence circuitry comprising:
   (a) snooping means for communications of cache coherence messages directly from a given processor unit to another processor unit;
   (b) directory means for communication of cache coherence messages directly from a given processor unit to a directory and then to at least one other processor unit when indicated by the directory;
   (c) evaluation means for evaluating the available bandwidth on the network used to communicate the cache coherence messages; and
   (d) selection means for choosing one the snooping means and directory means for the communication of a given cache coherence message based on the evaluation of available bandwidth determined by the evaluation means.

18. The cache coherence circuitry recited in claim 17 wherein the snooping means broadcasts the cache coherence message to all other processor units.

19. The cache coherence circuitry recited in claim 17 wherein the given cache coherence message identifies a block of the shared memory and wherein the directory provides an index linking blocks of memory to a set of processor units less than all the processor units and wherein the directory means sends the cache coherence message to the given set of processor units linked to the block of shared memory identified by the given cache coherence message.

20. The cache coherence circuitry recited in claim 19 wherein the directory means sends the cache coherence message directly over the network to the given set of processor units.

21. The cache coherence circuitry recited in claim 19 further including monitoring means for:
   (i) detecting insufficiency in the set of processor units to which the coherence message is transmitted;
   (ii) retrying the transmission of the cache coherence message to the given set of processor units; and
   (iii) upon repeated insufficiency in the set of processor units to which the transmission of the coherence message is retried, broadcasting the given cache coherence message to all processor units.

22. The cache coherence circuitry recited in claim 21 wherein the monitoring means appends a retry number to the cache coherence message and responses to the cache coherence message.

23. The cache coherence circuitry recited in claim 21 wherein the number of retries is limited to predetermined number less than ten.

24. The cache coherence circuitry recited in claim 17 wherein the evaluation means compares the available bandwidth against a predetermined threshold and selects the snooping means when the available bandwidth is greater than the threshold and selects the directory means when the available bandwidth is less than the threshold.

25. The cache coherence circuitry recited in claim 24 wherein the threshold is less than all of the bandwidth of the network.

26. The cache coherence circuitry recited in claim 25 wherein the threshold is substantially 75% of the capacity of the network.

27. The cache coherence circuitry recited in claim 17 wherein the selection means provides for successive given cache coherence messages being transmitted using a mix of the snooping means and the directory means the mix being a function of the evaluation of available bandwidth by the evaluation means to provide a semicontinuous variation in the mix.

28. The cache coherence circuitry recited in claim 27 wherein the selection of the snooping means or the directory means for a given cache coherence message is done pseudorandomly according to a probability function based on the evaluation of available bandwidth by the evaluation means.

29. The cache coherence circuitry recited in claim 17 wherein the snooping means multicasts the cache coherence message to a selected set of processor units based on a prediction as to which processor units have cache memories loaded with relevant data.

30. The cache coherence circuitry recited in claim 29 including a monitoring means monitoring the multicasting to detect insufficiency in the targets of the multicasting resulting from erroneous prediction and to initiates a retransmission of the cache coherence message.

31. The cache coherence circuitry recited in claim 17 wherein the evaluation of available bandwidth by the evaluation means monitors the communications on the network at the given processor unit transmitting the given cache coherence message.

32. The cache coherence circuitry recited in claim 17 wherein the directory means communicates cache coherence messages directly from a given processor unit to a directory and to the given processor unit.

* * * * *

UNITED STATES PATENT AND TRADEMARK OFFICE
CERTIFICATE OF CORRECTION

PATENT NO.   : 6,883,070 B2
DATED        : April 19, 2005
INVENTOR(S)  : Martin et al.

It is certified that error appears in the above-identified patent and that said Letters Patent is hereby corrected as shown below:

Column 9,
Line 65, "evaluating the" should be -- evaluating an --

Column 10,
Line 3, "a given" should be -- the given --
Line 5, "coherence message" should be -- coherence messages --
Lines 12, 17, and 22, "the given set" should be -- the set --
Lines 12, 16, 21, 28, 29 and 29, $2^{nd}$ occurrence, "the cache" should be -- the given cache --
Line 18, "step of" should be -- steps of --
Lines 20 and 24, "the coherence" should be -- the given cache coherence --
Line 28, "message append" should be -- message include the step include the step of appending --
Line 59, "a directory" should be -- the directory --

Column 11,
Line 3, "a directory" should be -- the directory --
Line 18, "the available" should be -- an available --
Line 28, "message to" should be -- messages to --
Lines 34, 38 and 45, "the cache" should be -- the given cache --
Lines 35, 39 and 46, "the given set" should be -- the set --
Lines 44 and 48, "the coherence" should be -- the given coherence --

UNITED STATES PATENT AND TRADEMARK OFFICE
CERTIFICATE OF CORRECTION

PATENT NO. : 6,883,070 B2
DATED : April 19, 2005
INVENTOR(S) : Martin et al.

It is certified that error appears in the above-identified patent and that said Letters Patent is hereby corrected as shown below:

Column 12,
Lines 2-3, line 3 ($2^{nd}$ occurrence); "the cache" should be -- the given cache --
Line 33, "the cache" should be -- the given cache --
Line 48, "a directory" should be -- the directory --
Line 48, "from a given" should be -- from the given --.

Signed and Sealed this

Nineteenth Day of July, 2005

JON W. DUDAS
*Director of the United States Patent and Trademark Office*